United States Patent
Brunninger

(10) Patent No.: US 10,232,863 B2
(45) Date of Patent: Mar. 19, 2019

(54) BULK MATERIAL LOADING WAGON

(71) Applicant: Plasser & Theurer Export von Bahnbaumaschinen Gesellschaft m.b.H., Vienna (AT)

(72) Inventor: Manfred Brunninger, Altenberg (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 82 days.

(21) Appl. No.: 15/129,110

(22) PCT Filed: Apr. 24, 2015

(86) PCT No.: PCT/EP2015/000848
§ 371 (c)(1),
(2) Date: Sep. 26, 2016

(87) PCT Pub. No.: WO2015/176794
PCT Pub. Date: Nov. 26, 2015

(65) Prior Publication Data
US 2017/0101113 A1 Apr. 13, 2017

(30) Foreign Application Priority Data
May 20, 2014 (AT) .................................. A 374/2014

(51) Int. Cl.
*B61D 3/00* (2006.01)
*B61D 47/00* (2006.01)
(Continued)

(52) U.S. Cl.
CPC ............... *B61D 47/00* (2013.01); *B61D 3/00* (2013.01); *B65G 15/00* (2013.01); *B65G 41/003* (2013.01); *B65G 67/10* (2013.01); *E01B 27/00* (2013.01)

(58) Field of Classification Search
CPC .......... B61D 3/00; B61D 47/00; B65G 67/10; B65G 41/003; E01B 27/022; E01B 2203/032
(Continued)

(56) References Cited

U.S. PATENT DOCUMENTS 882,132 A * 3/1908 Warman .................... E01H 5/09
414/339
4,923,355 A * 5/1990 Mancini .................. E01B 27/00
104/2
(Continued)

FOREIGN PATENT DOCUMENTS

AU 667591 B2 3/1996
EP 0 490 868 A1 6/1992
(Continued)

OTHER PUBLICATIONS

International Search Report of PCT/EP2015/000848, dated Oct. 9, 2015.

*Primary Examiner* — James Keenan
(74) *Attorney, Agent, or Firm* — Collard & Roe, P.C.

(57) ABSTRACT

A bulk material loading wagon (1) for incorporation into a loading train consisting of several such wagons has a storage box (3) for storing bulk material, the storage box being open at the top and fastened to a wagon frame (2), and—associated with the storage box—a bottom conveyor belt (5) extending in the lower region of the storage box (3) and in the longitudinal direction of the wagon. The wagon frame (2) is equipped with an opening (16), arranged between two adjacent on-track undercarriages (14), for passage of a lower section—adjoining the lower deflection end (9)—of a transfer conveyor belt (8). A drive (18) is provided for displacement of the transfer conveyor belt (8) in its conveying- or longitudinal direction (4) through the opening (18) relative to the wagon frame (2).

3 Claims, 1 Drawing Sheet

(51) Int. Cl.
*B65G 67/10* (2006.01)
*B65G 41/00* (2006.01)
*B65G 15/00* (2006.01)
*E01B 27/00* (2006.01)

(58) Field of Classification Search
USPC .......................................................... 414/339
See application file for complete search history.

(56) References Cited

U.S. PATENT DOCUMENTS

| | | | |
|---|---|---|---|
| 5,221,172 A | 6/1993 | Theurer et al. | |
| 5,289,648 A | 3/1994 | Theurer et al. | |
| RE35,788 E * | 5/1998 | Theurer | E01B 27/105 104/12 |
| 5,993,130 A | 11/1999 | Theurer et al. | |
| 5,993,131 A | 11/1999 | Theurer et al. | |
| 6,073,561 A * | 6/2000 | Theurer | E01B 27/02 104/7.3 |
| 7,192,238 B2 | 3/2007 | Theurer | |
| 9,605,387 B2 * | 3/2017 | Dehmel | B61D 15/00 |

FOREIGN PATENT DOCUMENTS

| | | |
|---|---|---|
| EP | 0 531 275 A1 | 3/1993 |
| EP | 0603149 A1 | 6/1994 |
| EP | 0878369 A1 | 11/1998 |
| RU | 2 022 073 C1 | 10/1994 |
| RU | 2 030 500 C1 | 3/1995 |
| RU | 2 152 320 C1 | 7/2000 |

\* cited by examiner

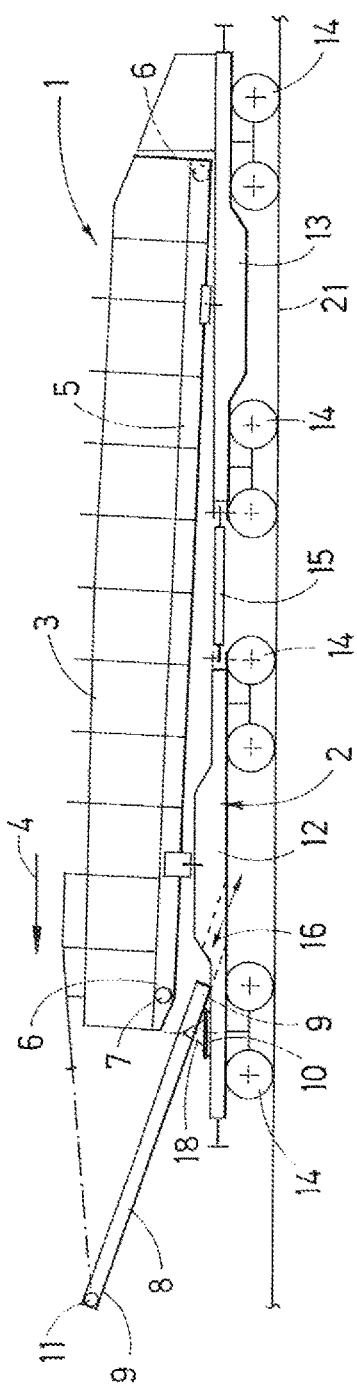
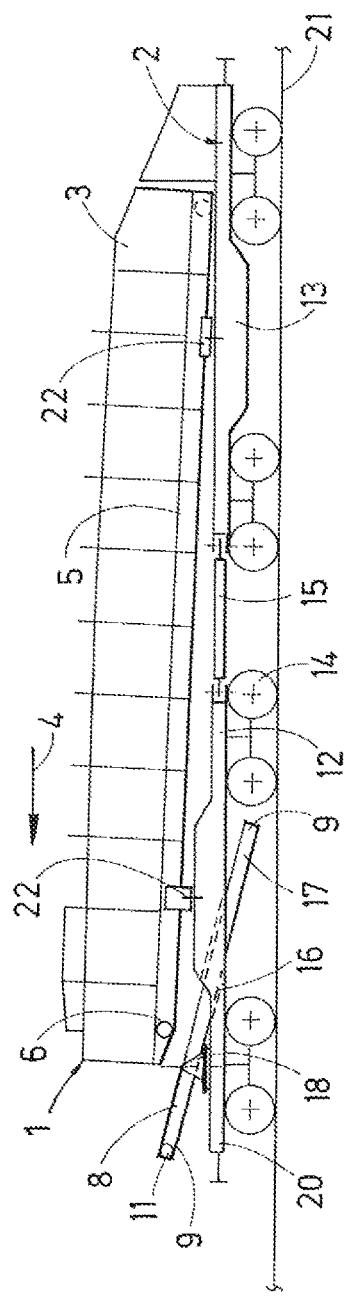
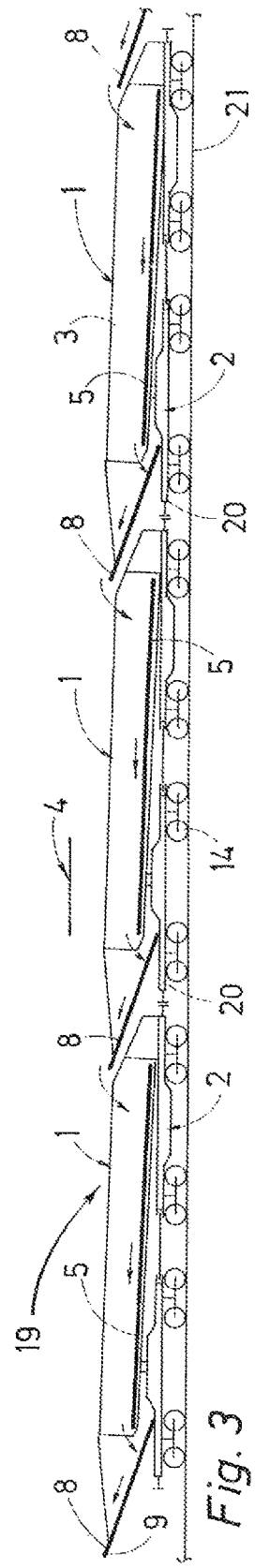

BULK MATERIAL LOADING WAGON

CROSS REFERENCE TO RELATED APPLICATIONS

This application is the National Stage of PCT/EP2015/000848 filed on Apr. 24, 2015, which claims priority under 35 U.S.C. § 119 of Austrian Application No. A 374/2014 filed on May 20, 2014, the disclosure of which is incorporated by reference. The international application under PCT article 21(2) was not published in English.

The invention relates to a bulk material loading wagon for incorporation into a loading train consisting of several such wagons, including a storage box for storing bulk material, the storage box being open at the top and fastened to a wagon frame, and—associated with the storage box—a bottom conveyor belt, extending in the lower region of the storage box and in the longitudinal direction of the wagon, which is designed endless while forming two deflection ends spaced from one another in the conveying direction and has a conveying drive, and further including a transfer conveyor belt arranged at an angle to the bottom conveyor belt, the transfer conveyor belt having a lower deflection end adjoining the wagon frame and an upper deflection end spaced farther from the wagon frame.

Bulk material loading wagons of this type are already widely known, for example from U.S. Pat. No. 5,993,130 or 7,192,238, and have proven themselves excellently in practice.

It is the object of the present invention to provide a bulk material loading wagon of the kind mentioned at the beginning with which improved operation is possible.

According to the invention, this object is achieved with a bulk material loading wagon of the specified type in that between two adjacent on-track undercarriages, the wagon frame has an opening for passage of a lower section—adjoining the lower deflection end—of the transfer conveyor belt, and that a drive is provided for displacement of the transfer conveyor belt in its conveying- or longitudinal direction through the opening relative to the wagon frame.

Due to the transfer conveyor belt being displaceable in this manner, it is possible to preclude with a minimum of necessary retooling operations' a protrusion beyond the wagon frame which is not permitted for transfer travel. Thus, a special wagon for taking up the projecting section of the transfer conveyor belt, which has heretofore been required for the transfer travel of the bulk material loading wagon, now becomes superfluous.

Additionally, there is the advantageous possibility of an extended operation of the transfer conveyor belt in its retracted position. In this position, when the conveying direction is reversed, stored bulk material can now be introduced from the bottom conveyor belt directly onto the track.

Additional advantages of the invention become apparent from the dependent claims and the drawing description.

The invention will be described in more detail below with reference to an embodiment represented in the drawing in which FIGS. 1 and 2 each show an enlarged side view of a bulk material loading wagon, and FIG. 3 shows a schematically simplified loading train.

A bulk material loading wagon 1, depicted in a schematically simplified manner in FIGS. 1 and 2, has a storage box 3 for containment and storage of bulk material, the storage box being upwardly open and supported on a wagon frame 2. In the lower region of the storage box 3, a bottom conveyor belt 5 extending in a conveying direction or longitudinal direction 4 of the wagon is provided in place of a bottom surface. Said bottom conveyor belt 5 is designed endless while forming two deflection ends 6 spaced from one another in the conveying- or longitudinal direction 4 of the wagon, and is connected to a conveying drive 7.

Provided immediately in front of the front deflection end 6 of the bottom conveyor belt 5—with regard to the conveying direction 4—is a transfer conveyor belt 8 positioned at an angle to the former and projecting beyond the wagon frame 2. Said transfer conveyor belt 8 has a lower deflection end 9 adjoining the wagon frame 2 and an upper deflection end 9 spaced farther from the wagon frame 2 and is connected to the wagon frame 2 for rotation about a vertical axis by means of an articulation 10. A conveying drive 11 connected to the transfer conveyor belt 8 is designed for selective reversal of the conveying direction 4 for the bulk material in the direction towards the upper or lower deflection end 9.

The wagon frame 2 connected to the storage box 3 consists of two frame parts 12, 13 arranged one following the other in the longitudinal direction of the wagon. Each of these frame parts 12, 13 has two on-track undercarriages 14 spaced from one another in the longitudinal direction of the wagon, and both frame parts 12, 13 are connected to one another by means of a coupling rod 15.

Between two adjacent on-track undercarriages 14 of the front frame part 12, the wagon frame 2 has an opening 16 for passage of a lower section 17—adjoining the lower deflection end 9—of the transfer conveyor belt 8 (FIG. 2). A drive 18 connected to the articulation 10 is provided for this displacement of the transfer conveyor belt 8 in its conveying- or longitudinal direction 4 through the opening 16 relative to the wagon frame 2.

FIG. 3 shows a loading train 19 which is composed of an arbitrary number of bulk material loading wagons 1 arranged one following the other in the longitudinal direction of the wagon and coupled to one another. This makes it possible to transport stored bulk material via the transfer conveyor belt 8 onto an adjoining, preceding bulk material loading wagon 1. For that purpose, each of the transfer conveyor belts 8 is in the extended position visible in FIG. 1, in which the upper deflection end 9 in each case projects beyond a front end 20 of the wagon frame 2.

As shown in FIG. 2, the transfer conveyor belt 8 has been retracted with the aid of the drive 18 by guiding the lower section 17 through the opening 16 of the front frame part 12. In this position, the upper deflection end 9 no longer projects beyond the front end 20 of the wagon frame 2.

In this position, a further variant of working operations is possible, as desired, in that—by reversing the conveying direction 4 of the transfer conveyor belt 8—bulk material which has been discharged by the bottom conveyor belt 5 via the front deflection end 6 thereof can be discharged in a targeted manner via the lower deflection end 9 upon a track 21, located thereunder, for ballasting the same.

The storage box 3 is supported via two support devices 22 on the front and rear wagon frame 2. The front support device 22 has a drive, not shown in detail, by means of which the storage box 3 is vertically adjustable relative to the front wagon frame 2 by a small degree. With this, the transfer conveyor belt 8—in the position shown in FIG. 1—can be pivoted transversely without problems in order to be able to unload the stored bulk material laterally next to the track.

The invention claimed is:

1. A bulk material loading wagon for incorporation into a loading train comprising:
a plurality of wagons, each wagon comprising:
a storage box for storing bulk material, the storage box being open at the top;
a wagon frame, coupled to the storage box;
a bottom conveyor belt, extending in the lower region of the storage box and in the longitudinal direction of the wagon, wherein the bottom conveyor belt is endless and has two deflection ends spaced from one another in a conveying direction;
a conveying drive, and
a transfer conveyor belt arranged at an angle to the bottom conveyor belt, the transfer conveyor belt having a lower deflection end adjoining the wagon frame and an upper deflection end spaced farther from the wagon frame,
two adjacent on-track undercarriages, wherein the wagon frame has an opening disposed between said two adjacent on-track undercarriages for passage of a lower section of the transfer conveyor belt adjoining the lower deflection end thereof, and said conveying drive is provided for displacement of the transfer conveyor belt in a conveying direction thereof through said opening relative to the wagon frame.

2. The wagon according to claim 1, wherein the wagon frame is composed of two frame parts, arranged one following the other in a longitudinal direction of the wagon, each of which is connected to said two on-track undercarriages spaced from one another in the longitudinal direction of the wagon, wherein the opening for passage of the transfer conveyor belt is arranged between the two on-track undercarriages of a frame part of said two frame parts connected to the transfer conveyor belt.

3. The wagon according to claim 1, wherein said conveying drive connected to the transfer conveyor belt is designed for selective reversal of the conveying direction for the bulk material in the direction towards the upper or the lower deflection end.

* * * * *